United States Patent
Lee et al.

(10) Patent No.: US 8,212,979 B2
(45) Date of Patent: Jul. 3, 2012

(54) METHOD OF MANUFACTURING SPACER FOR LIQUID CRYSTAL DISPLAY DEVICE, SUBSTRATE FOR LIQUID CRYSTAL DISPLAY DEVICE HAVING SPACER MANUFACTURED BY THE METHOD AND LIQUID CRYSTAL DISPLAY DEVICE HAVING THE SAME

(75) Inventors: Keon-Woo Lee, Daejeon (KR); Sang-Kyu Kwak, Daejeon (KR); Dong-Kung Oh, Daejeon (KR); Chang-Ho Cho, Anseong-si (KR); Sung-Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 292 days.

(21) Appl. No.: 12/450,577

(22) PCT Filed: Apr. 4, 2008

(86) PCT No.: PCT/KR2008/001940
§ 371 (c)(1),
(2), (4) Date: Oct. 1, 2009

(87) PCT Pub. No.: WO2008/123719
PCT Pub. Date: Oct. 16, 2008

(65) Prior Publication Data
US 2010/0118244 A1    May 13, 2010

(30) Foreign Application Priority Data
Apr. 6, 2007 (KR) .................. 10-2007-0034322

(51) Int. Cl.
*G02F 1/1339* (2006.01)
*G02F 1/1333* (2006.01)

(52) U.S. Cl. ......... 349/122; 348/187; 348/155; 348/158
(58) Field of Classification Search .............. 349/187, 349/122, 155, 156, 157, 138, 158, 93, 104, 349/106, 110
See application file for complete search history.

(56) References Cited

U.S. PATENT DOCUMENTS

| | | | | |
|---|---|---|---|---|
| 6,429,921 | B1 | 8/2002 | Chen et al. ..................... | 349/155 |
| 6,690,445 | B2 * | 2/2004 | Matsumoto ................... | 349/155 |
| 6,705,584 | B2 | 3/2004 | Hiroshima et al. ........... | 349/155 |
| 7,046,327 | B2 | 5/2006 | Okamoto et al. ............. | 349/155 |
| 7,595,855 | B2 * | 9/2009 | Lee et al. ...................... | 349/156 |
| 7,643,111 | B2 * | 1/2010 | Kim et al. ..................... | 349/108 |
| 2004/0233378 | A1 | 11/2004 | Okamoto et al. ............. | 349/156 |
| 2005/0157245 | A1 * | 7/2005 | Lin et al. ....................... | 349/155 |
| 2007/0070287 | A1 * | 3/2007 | Lee et al. ...................... | 349/156 |
| 2008/0297704 | A1 * | 12/2008 | Hashimoto ................... | 349/106 |
| 2010/0118244 | A1 * | 5/2010 | Lee et al. ...................... | 349/122 |

FOREIGN PATENT DOCUMENTS

| | | |
|---|---|---|
| JP | 10-282327 | 10/1998 |
| JP | 11-72613 A | 3/1999 |
| KR | 10-2004-0101087 | 12/2004 |
| KR | 10-2005-0068507 | 7/2005 |

* cited by examiner

*Primary Examiner* — Brian Healy
(74) *Attorney, Agent, or Firm* — McKenna Long & Aldridge LLP

(57) ABSTRACT

The present invention provides a method of manufacturing a spacer for a liquid crystal display device that includes a step a) of forming a spacer body on a substrate body and a step b) forming a passivation film on the spacer body, a substrate for a liquid crystal display device having the spacer manufactured by the method, and a liquid crystal display device having the substrate for the liquid crystal display device.

17 Claims, 1 Drawing Sheet

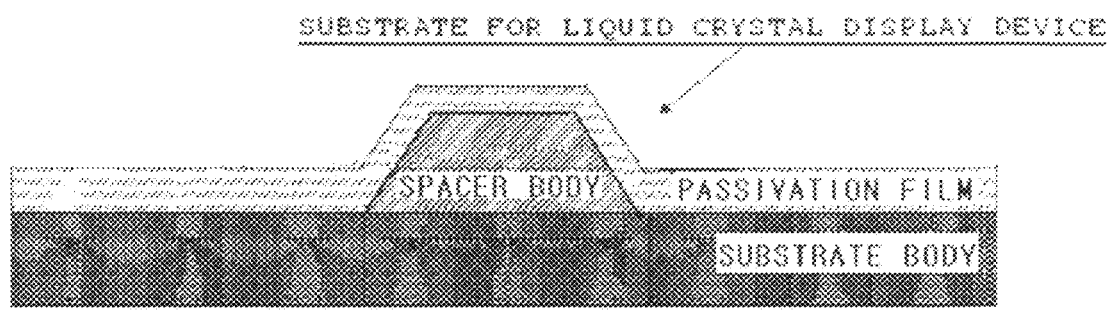

METHOD OF MANUFACTURING SPACER FOR LIQUID CRYSTAL DISPLAY DEVICE, SUBSTRATE FOR LIQUID CRYSTAL DISPLAY DEVICE HAVING SPACER MANUFACTURED BY THE METHOD AND LIQUID CRYSTAL DISPLAY DEVICE HAVING THE SAME

This application claims the benefit of PCT/KR2008/001940 filed on Apr. 4, 2008 and Korean Patent Application No. 10-2007-0034322 filed on Apr. 6, 2007, both of which are hereby incorporated herein by reference for all purposes in their entirety.

TECHNICAL FIELD

The present invention relates to a method of manufacturing a spacer for a liquid crystal display device that is less deformed by an external force, is completely restored to an original shape after the removal of the external force, and is not detached at an interface, a substrate for a liquid crystal display device having the spacer manufactured by the method, and a liquid crystal display device having the substrate for the liquid crystal display device.

This application claims priority from Korean Patent Application No. 10-2007-0034322 filed on Apr. 6, 2007 in the Korean Intellectual Property Office, the disclosure of which is incorporated herein by reference in its entirety.

BACKGROUND ART

A liquid crystal display device includes a thin film transistor substrate for driving, a color filter substrate for displaying colors, and a liquid crystal provided between the substrates.

A distance between the thin film transistor substrate and the color filter substrate, that is, a cell gap is maintained constant to obtain a uniform screen on the liquid crystal display device. A spacer functions to maintain the distance between the substrates constant.

Examples of a material of the spacer may include spherical silica, a polymer, surface-treated spherical silica, a surface-treated polymer, or a glass fiber piece having a constant diameter. In addition, a photo spacer may be manufactured using photosensitive material. The photo spacer is manufactured by forming a film with photosensitive material and pattering the film by a photolithographic method.

As a liquid crystal display device having the above-mentioned structure has became larger and been applied to a monitor or a television in recent years, there have been various troubles in terms of the quality and manufacturing process of a liquid crystal display device.

For example, if a large liquid crystal display device of which diagonal length is 20 inches or more is left for a predetermined time or more under high temperature and humidity while standing vertically, white strips are formed on the lower side of the liquid crystal display device. These are called gravity defects.

The amount of liquid crystal in the liquid crystal display device may be decreased to solve the gravity defects. However, in this case, there is a problem in that the durability of the liquid crystal display device deteriorates.

Accordingly, the amount of liquid crystal in the liquid crystal display device should be in a predetermined range, and the predetermined range is called a liquid crystal margin. The liquid crystal margin is affected by mechanical properties of the spacer.

That is, if it is possible to prevent the durability from deteriorating even though the amount of liquid crystal is small, the liquid crystal margin is increased and it is possible to minimize defects during the manufacture to improve the durability of the liquid crystal display device.

The spacer, which is manufactured by a method widely known at present, has other problems in that the spacer may be lost during a rubbing process and may be detached by a strong external force.

Several minutes are generally taken to perform the rubbing process that makes a thin film for aligning liquid crystal, that is, an alignment film have anisotropy. The intensity of the rubbing may be increased to reduce the time taken to perform the rubbing process.

In this case, the spacer may be separated due to friction, and pixels of a region corresponding to the spacer do not function normally and are observed as a white spot, which causes defects.

Further, even when strong impact is applied from the outside, cracks are formed at a weak portion between the spacer and a lower support film, so that the spacer is detached.

The size of the spacer may be increased or the adhesive strength thereof may be improved in order to prevent this. However, in the case of the former, since the maximum size of the spacer has already been determined according to an aperture ratio of design and a dielectric constant, it is difficult to increase the size of the spacer. In the case of the latter, there is a problem in that the stability of a material of the spacer deteriorates.

DISCLOSURE OF INVENTION

Technical Problem

An object of the present invention is to provide a method of manufacturing a spacer for a liquid crystal display device that is less deformed by an external force, is completely restored to an original shape after the removal of the external force, and is not detached at an interface, a substrate for a liquid crystal display device having the spacer manufactured by the method, and a liquid crystal display device having the substrate for the liquid crystal display device.

Technical Solution

The present invention provides a method of manufacturing a spacer for a liquid crystal display device. The method includes a step a) of forming a spacer body on a substrate body and a step b) of forming a passivation film on the spacer body.

The present invention provides a substrate for a liquid crystal display device that includes a substrate body and a spacer. The spacer includes a spacer body formed on the substrate body and a passivation film formed on the spacer body.

The present invention provides a liquid crystal display device. The liquid crystal display device includes a color filter substrate, a thin film transistor substrate disposed to face the color filter substrate, a spacer that includes a spacer body formed at least one substrate body of the color filter substrate and the thin film transistor substrate and a passivation film formed on the spacer body, and a liquid crystal layer that is formed in a gap between the color filter substrate and the thin film transistor substrate.

Advantageous Effects

According to the present invention, since the spacer body is protected by the passivation film, the durability of the spacer against an external force is improved and the detachment of the spacer is decreased at the interface.

Further, the elastic recovery of the spacer is excellent. Therefore, a liquid crystal margin is improved during the manufacture of a liquid crystal cell, the durability of the spacer against rubbing is improved, and the durability of the liquid crystal display device against an external force is also improved.

BRIEF DESCRIPTION OF THE DRAWINGS

FIG. 1 is a cross-sectional view of a substrate for a liquid crystal display device according to the present invention.

BEST MODE FOR CARRYING OUT THE INVENTION

A method of manufacturing a spacer for a liquid crystal display device according to the present invention includes a step a) of forming a spacer body on a substrate body, and a step b) of forming a passivation film on the spacer body.

In the step a), the substrate body may be a color filter substrate body or a thin film transistor substrate body, and it is preferable that the spacer for the liquid crystal display device according to the present invention be formed on the color filter substrate body.

In the step a), the spacer body may include silica, polymer, surface-treated silica, surface-treated polymer, or fiber piece.

When being used, the silica, the polymer or the fiber piece may be processed in the shape of a sphere or a cylinder having a predetermined size, that is, a diameter equal to a distance between liquid crystal cells.

Examples of a method of processing the silica, the polymer, or the fiber piece include a grinding method that grinds an object by mechanical friction, and a quenching method that quickly cools a molten object in water or an organic solvent.

The silica, the polymer, or the fiber piece that is processed in the shape of using the above-mentioned methods may be dispersed into an organic solvent such as isopropyl alcohol, and then scattered on the substrate body in order to form the spacer body.

In this case, as long as the polymer or the fiber piece is not melted at 5 to 100° C., the kind of the polymer or the fiber piece is not particularly limited. Examples of the polymer may include polyimide, polystyrene, and polyimide.

Meanwhile, silica and the polymer are processed in the shape of using the grinding method or the quenching method, and then surface-treated in order to be used.

Examples of a method of performing surface treatment of silica and the polymer may include a method of making a polymer be absorbed into the surface thereof.

A polymer, which has functional groups of silane, siloxane, carboxylic acid, acryl, or epoxy at ends thereof, may be preferably used as the polymer that is to be absorbed into the surface of silica and the polymer.

When the silica or the polymer are surface-treated and then used, it is possible to improve adhesive strength between the silica or the polymer and the substrate body.

In the step a), the spacer body may be a photo spacer body that includes photosensitive material.

The photo spacer body may be made of a photosensitive material that includes a binder polymer, a cross-linker, a photoinitiator, and a solvent. However, the material of the photo spacer body is not limited thereto.

A material, which is obtained by copolymerizing glycidyl methacrylate (GMA) or benzyl methacrylate (BzMA) to polymethyl methacrylate, may be used as the binder polymer.

As long as the cross-linker is an organic compound including two or more acryl groups, the kind of the cross-linker is not particularly limited. Examples of the cross-linker may include pentaerythritol triacrylate and dipentaerythritol hexaacrylate.

A material, which absorbs an ultraviolet ray and forms a radical, such as Irgacure 907 or Irgacure 369 manufactured by Ciba-Geigy Corp. may be used as the photoinitiator. However, the photoinitiator is not particularly limited to this structure or this kind.

As long as the solvent has a boiling point in the range of 80 to 250° C. and can effectively dissolve the above-mentioned materials, the kind of the solvent is not limited.

Examples of the solvent may include propylene glycol methyl ether acetate.

If the spacer body is a photo spacer body in the step a), the spacer body may be formed by applying photosensitive material to form a film and then patterning the film using a photolithographic method. The method of forming the spacer body is not limited thereto. As long as photolithography is performed on the photo spacer body, the photo spacer body may be made of various materials.

When a film is directly formed on a substrate body by the method according to the present invention as described above and is patterned to form the spacer body, the spacer body is more easily manufactured and more firmly attached to the substrate body as compared to a spherical spacer body that is formed by growing spherical particles and attaching the spherical particles on the substrate body. Therefore, it is possible to prevent the spacer from being detached at the interface.

In the step b), the passivation film may be formed to cover both the spacer body and the substrate body on which the spacer body is formed.

The passivation film may be formed to cover both the spacer body and the substrate body on which the spacer body is formed, but may be formed to cover the only spacer body.

When being formed in the step b), the passivation film is formed to cover the only region of the outer surface of the spacer body, which excludes a region coming in contact with the substrate body. In this case, the passivation film is more easily formed and uniform characteristics are obtained as compared to when the passivation film is formed to cover the entire outer surface of the spacer body, which is preferable.

When the passivation film is intended to be formed to cover the only spacer body, the passivation film may be formed by forming a film with a photosensitive material having photosensitivity and then patterning the film using photolithographic method.

When the passivation film is made of the photosensitive material so as to cover the only spacer body, additional cost is required because a mask is required in addition to an exposure process using light. In this case, a thermosetting polymer may be preferably used to form the passivation film, but the material of the passivation film is not necessarily limited thereto.

When the passivation film is formed to cover both the spacer body and the substrate body on which the spacer body is formed, additional cost is not required because a mask is not required. Accordingly, it is possible to easily form the passivation film with a photocurable polymer or a thermosetting polymer.

In the step b), the passivation film may be formed by a method selected from a photolithographic method, a photo curing method, a thermosetting method, a sputtering method, and a chemical vapor deposition method. It is possible to easily form the passivation film by these methods.

That is, it is possible to form the passivation film by a method selected from a photolithographic method using a mask, a photo curing method that includes coating a photosensitive material on the entire surface without using a mask and curing the photosensitive material by exposure, a thermosetting method that uses a thermosetting polymer without using a mask, a sputtering method using an inorganic material, and a chemical vapor deposition method.

When the passivation film is formed by a photolithographic method or a thermosetting method, examples of the material of the passivation film to be used may include an acryl resin, an epoxy resin, a polyimide resin, and a polyamic acid resin. However, the material of the passivation film is not limited thereto. As long as a photosensitive material suitable for a photolithographic method or a thermosetting material suitable for a thermosetting method is used, any material may be used as the material of the passivation film.

In the case of the photolithographic method, the passivation film may be formed by forming a film by using a spin coater or a slit coater, exposing the film by using a mask, developing the film, and firing the film at high temperature. In this case, if the film formed using the spin coater or the slit coater is not patterned, that is, the passivation film is formed to cover both the spacer body and the substrate body on which the spacer body is formed, the mask may not be used.

In the case of the thermosetting method, the passivation film may be formed by forming a film by using a spin coater or a slit coater and firing the film at high temperature.

Examples of the material of the passivation film used when the passivation film is formed by the sputtering method or the chemical vapor deposition method may include indium tin oxide and silicate. However, the material of the passivation film is not limited thereto. As long as a material is suitable for the sputtering method or the chemical vapor deposition method, any material may be used as the material of the passivation film.

Example of the sputtering method may include a plasma sputtering method where an inert gas such as argon or neon is used alone or the mixture of the inert gas and nitrogen or oxygen is used and DC or AC electric field is used.

A method, which uses a sublimation property at high temperature, may be used in the case of the chemical vapor deposition method.

In the step b), it is preferable that the thickness of the passivation film be in the range of 0.05 to 2 μm.

If the thickness of the passivation film is less than 0.05 μm, the characteristics of the passivation film may not be satisfactorily obtained and it may be difficult to perform uniform coating. If the thickness of the passivation film is more than 2 μm, the luminance of the liquid crystal display device may deteriorate due to the light absorption of the passivation film.

Further, in order to satisfactorily ensure the characteristics, it is preferable that the strength of the passivation film be 0.1 to 3 times as large as the strength of the material of the spacer.

In the step b), the passivation film may be an organic film. In this case, if the passivation film is formed of an organic film and the spacer body is covered with the passivation film that is an organic film, the deformation of the spacer body caused by an external force is suppressed, a recovery property after the removal of the external force is increased, and the detachment of the spacer body is decreased at the interface.

The organic film may include a thermosetting resin or a photocurable resin.

Examples of the thermosetting resin may include an epoxy resin, a polyamic acid resin, and an acryl resin including a hardener. However, the thermosetting resin is not limited thereto.

A photosensitive compound formed of organic materials, a transparent material, or a material into which a pigment is dispersed may be used as the photocurable resin. In the case of the material into which a pigment is dispersed, a mask may be used to form patterns to avoid the deterioration of the luminance. In this case, the spacer body is not exposed to the outside, and should be covered.

A negative type polymer solution, which contains an acryl cross-linker as a polymer or a monomer and a photoinitiator capable of forming a radical by using light, may be used as a photocurable resin applicable to this case.

Specific examples of the photocurable resin may include an acryl resin, a methacrylic acid resin, and a polyimide resin. However, the photocurable resin is not limited thereto.

When the passivation film is made of a thermosetting resin or a photocurable resin, more excellent heat-resisting property and durability are obtained as compared to when the passivation film is made of a thermoplastic resin, which is preferable.

According to the present invention, since the spacer body is protected by the passivation film as described above, the durability of the spacer against an external force is improved and the detachment of the spacer is decreased at the interface.

Further, the elastic recovery of the spacer is excellent. Therefore, a liquid crystal margin is increased during the manufacture of a liquid crystal cell, the durability of the spacer against rubbing is improved, and the durability of the liquid crystal display device against an external force is also improved.

Meanwhile, the substrate for the liquid crystal display device according to the present invention may include a substrate body, and a spacer that includes a spacer body formed on the substrate body and a passivation film formed on the spacer body. In this case, the spacer may be a spacer that is manufactured by the above-mentioned method according to the present invention.

The spacer body may include silica, polymer, surface-treated silica, surface-treated polymer, or fiber piece.

The spacer body may be a photo spacer body that includes photosensitive material.

The passivation film may be formed to cover the only spacer body, or may be formed to cover both the spacer body and the substrate body on which the spacer body is formed.

The thickness of the passivation film may be in the range of 0.05 to 2 μm.

The passivation film may be an organic film that includes a thermosetting resin or a photocurable resin.

In this case, the substrate for the liquid crystal display device according to the present invention may be a color filter substrate or a thin film transistor substrate.

Meanwhile, a liquid crystal display device according to the present invention may include a color filter substrate, a thin film transistor substrate disposed to face the color filter substrate, a spacer that includes a spacer body formed at least one substrate body of the color filter substrate and the thin film transistor substrate and a passivation film formed on the spacer body, and a liquid crystal layer that is formed in a gap between the color filter substrate and the thin film transistor substrate. In this case, the spacer may be a spacer that is manufactured by the above-mentioned method according to the present invention.

The passivation film may be formed to cover the only spacer body, or may be formed to cover both the spacer body and the substrate body on which the spacer body is formed.

The thickness of the passivation film may be in the range of 0.05 to 2 μm.

The passivation film may include a thermosetting resin or a photocurable resin.

MODE FOR THE INVENTION

As shown in FIG. 1, a substrate for a liquid crystal display device according to the present invention includes a substrate body; a spacer body formed on the substrate body; and a passivation film covering both the spacer body and the substrate body on which the spacer body is formed. In this case, the substrate for the liquid crystal display device may be a color filter substrate.

As shown in FIG. 1, the passivation film may be formed to cover both the spacer body and the substrate body on which the spacer body is formed. Alternatively, although not shown in the drawings, the passivation film may be formed to cover the only spacer body.

The present invention will be described in detail below with reference to the following examples. In this case, Examples are illustrative, but the present invention is not limited to Examples.

Example 1

The following photosensitive composition was used to form a spacer body.

8 parts by weight of benzyl methacrylate(BzMA)/methyl-methacrylate(MMA) (mole ratio: 70/30, Mw: 24,000) as an alkali soluble resin binder, 16 parts by weight of dipentaerythritol hexaacrylate as a polymerizable compound, 1 part by weight of 2-benzyl-2-dimethylamino-1-(4-morpholinophenyl)-butane-1-one (trade name Irgacure-369, Ciba-Geigy Corp.) as a photopolymerization initiator, and 75 parts by weight of propylene glycol monomethyl ether acetate (PGMEA) as an organic solvent were mixed to one another for 3 hours by a shaker.

This mixed photosensitive solution was filtered by a filter of 5 microns, spin-coated on a glass substrate body, and then preheated at about 100° C. for 2 minutes, so that a film having a constant thickness of about 3.0 μm was formed on the glass substrate body.

The film is exposed using a photomask, which had circular isolated patterns of a diameter 30 μm, under a high pressure mercury lamp. After that, the patterns were developed by a KOH aqueous alkaline solution having a pH in the range of 11.3 to 11.7, and the film was then washed by deionized water. The film is postheated at 200° C. for about 40 minutes, so that a spacer body was formed on the glass substrate body.

The same photosensitive composition as the spacer body was spin-coated on the glass substrate body on which the spacer body is formed. Then, the photosensitive composition was preheated at about 100° C. for 2 minutes, so that films having a constant thickness of about 0.05, 0.5, 1.0, and 2.0 μm were formed.

The film is exposed using a photomask, which had circular isolated patterns of a diameter 100 μm, under a high pressure mercury lamp. After that, the patterns were developed by a KOH aqueous alkaline solution having a pH in the range of 11.3 to 11.7, and the film was then washed by deionized water. The film is postheated at 200° C. for about 40 minutes, so that a passivation film was formed on the glass substrate body so as to cover the only spacer body.

The strength of a thin film, the degree of deformation of a pattern, the elastic recovery of a pattern, and the detachment strength of a pattern of the spacer according to the present invention, which includes the spacer body and the passivation film formed as described above, were measured by a microhardness tester H-100© (manufactured by Fischerscope, Germany).

Example 2

Example 2 was formed in the same manner as in Example 1 except that exposure was performed on the entire surface without using the photomask that had circular isolated patterns of a diameter 100 μm and was used to form the passivation film of Example 1. In Example 2, a passivation film was formed to cover both the spacer body and the entire upper surface of the glass substrate body.

Example 3

Example 3 was formed in the same manner as in Example 2 except that a thermosetting epoxy material (trade name: SPK303SH-K11, LG Chem, Ltd.) was used to form a passivation film.

Comparative Example 1

Comparative example 1 was formed in the same manner as in Example 1 except that a passivation film was not formed.

[Evaluation of Physical Properties of Spacer Pattern]

Table 1 shows evaluation results of physical properties of the spacer pattern according to Examples 1 to 3 and Comparative example 1.

TABLE 1

| | THICKNESS OF PASSIVATION FILM (MICRON) | STRENGTH OF PASSIVATION FILM (GPa) | DEGREE OF DEFORMATION (MICRON) | ELASTIC RECOVERY (%) | DETACHMENT STRENGTH (mN) |
|---|---|---|---|---|---|
| EXAMPLE 1 | 0.05 | 0.28 | 0.19 | 86 | 280 |
| EXAMPLE 1 | 0.5 | 0.28 | 0.18 | 88 | 340 |
| EXAMPLE 1 | 1.0 | 0.28 | 0.16 | 92 | 540 |
| EXAMPLE 1 | 2.0 | 0.28 | 0.18 | 96 | 540 |
| EXAMPLE 2 | 0.05 | 0.28 | 0.19 | 86 | ∞ |
| EXAMPLE 2 | 0.5 | 0.28 | 0.18 | 88 | ∞ |
| EXAMPLE 2 | 1.0 | 0.28 | 0.16 | 92 | ∞ |
| EXAMPLE 2 | 2.0 | 0.28 | 0.18 | 96 | ∞ |
| EXAMPLE 3 | 0.05 | 0.24 | 0.16 | 89 | ∞ |
| EXAMPLE 3 | 0.5 | 0.24 | 0.14 | 92 | ∞ |

TABLE 1-continued

|  | THICKNESS OF PASSIVATION FILM (MICRON) | STRENGTH OF PASSIVATION FILM (GPa) | DEGREE OF DEFORMATION (MICRON) | ELASTIC RECOVERY (%) | DETACHMENT STRENGTH (mN) |
|---|---|---|---|---|---|
| EXAMPLE 3 | 1.0 | 0.24 | 0.16 | 96 | ∞ |
| EXAMPLE 3 | 2.0 | 0.24 | 0.16 | 99 | ∞ |
| COMPARATIVE EXAMPLE 1 | — | — | 0.21 | 78 | 160 |

The physical properties of the spacer pattern according to Examples 1 to 3 and Comparative example 1 were measured by the following methods.

(1) Strength of thin film: A tip having a vickers geometry was used as a tip of the microhardness tester H-100© (manufactured by Fischerscope, Germany), and indentation was performed on a film up to a specific depth. Then, the strength at the specific depth was defined as the strength of the thin film.

The indentation depth was set to 10% or less of the thickness of a thin film in order to prevent the generation of data errors that are generated due to a substrate body effect.

(2) Degree of deformation: A plate-shaped tip having a flat geometry was used as a tip of the microhardness tester H-100© (manufactured by Fischerscope, Germany), and indentation was performed on a film up to a predetermined load. Then, the degree of deformation was measured and defined as the degree of deformation.

The indentation depth was set to 10% or less of the thickness of a thin film in order to prevent the generation of data errors that are generated due to a substrate body effect. As the degree of deformation is decreased, the resistance of the spacer against an external force is increased. Therefore, it is preferable that the degree of deformation be as small as possible.

(3) Elastic recovery: A plate-shaped tip having a flat geometry was used as a tip of the microhardness tester H-100© (manufactured by Fischerscope, Germany), and indentation was performed on a film up to a predetermined load. Then, the degree of deformation was measured, and the degree of residual deformation was measured when a force was removed. After that, a ratio between the measured values was obtained, that is, a value obtained by dividing the maximum degree of deformation into the residual deformation when the force was removed was obtained. Subsequently, a value was obtained by subtracting the ratio from 1, and then converted into a percentage. The percentage was defined as the elastic recovery.

The indentation depth was set to 10% or less of the thickness of a thin film in order to prevent the generation of data errors that are generated due to a substrate body effect. As the elastic recovery is increased, the spacer is restored well after the removal of the external force. It is preferable that the elastic recovery be as large as possible.

(4) Detachment strength: A plate-shaped tip having a flat geometry was used as a tip of the microhardness tester H-100© (manufactured by Fischerscope, Germany), and indentation was performed on a film while a force was continuously increased. Then, the force was measured at an inflection point, and was defined as detachment strength.

The detachment effect was not affected by the substrate body. If the inflection point was not observed even though the spacer pattern was deformed up to 90% of the thickness thereof, the detachment strength was defined as an infinite.

As the detachment strength is increased, a defect rate is decreased in a rubbing process and a possibility of destroy of pixels is decreased. Therefore, it is preferable that the detachment strength be as large as possible.

From Table 1 that shows the evaluation results of the physical properties, it could be understood that the spacers according to Examples 1 to 3 have smaller degree of deformation, larger elastic recovery, and more excellent detachment strength as compared to the spacer according to Comparative example 1 because including the passivation film.

As described above, if the spacer for the liquid crystal display device is manufactured by the method according to the present invention, it is possible to provide a spacer for a liquid crystal display device that has excellent durability and elastic recovery against an external force, and to reduce the detachment of the spacer at an interface.

The invention claimed is:

1. A method of manufacturing a spacer for a liquid crystal display device, the method comprising:
    forming a spacer body on a substrate body; and
    forming a passivation film on the spacer body, wherein a thickness of the passivation film is in the range of 0.05 to 2 μm.

2. The method as set forth in claim 1, wherein in the forming of the spacer body, the substrate body is a color filter substrate body or a thin film transistor substrate body.

3. The method as set forth in claim 1, wherein in the forming of the passivation film, the passivation film is formed to cover both the spacer body and the substrate body on which the spacer body is formed.

4. The method as set forth in claim 1, wherein in the forming of the passivation film, the passivation film is formed by a method selected from a photolithographic method, a photo curing method, a thermosetting method, a sputtering method, and a chemical vapor deposition method.

5. The method as set forth in claim 1, wherein in the forming of the passivation film, the passivation film is an organic film.

6. The method as set forth in claim 5, wherein the organic film includes a thermosetting resin or a photocurable resin.

7. A substrate for a liquid crystal display device, the substrate comprising:
    a substrate body; and
    a spacer that includes a spacer body formed on the substrate body and a passivation film formed on the spacer body, wherein a thickness of the passivation film is in the range of 0.05 to 2 μm.

8. The substrate as set forth in claim 7, wherein the passivation film is formed to cover both the spacer body and the substrate body on which the spacer body is formed.

9. The substrate as set forth in claim 7, wherein the passivation film is an organic film that includes a thermosetting resin or a photocurable resin.

10. The substrate as set forth in claim 7, wherein the substrate is a color filter substrate or a thin film transistor substrate.

11. A liquid crystal display device comprising:
a color filter substrate;
a thin film transistor substrate disposed to face the color filter substrate;
a spacer that includes a spacer body formed at least one substrate body of the color filter substrate and the thin film transistor substrate and a passivation film formed on the spacer body; and
a liquid crystal layer that is formed in a gap between the color filter substrate and the thin film transistor substrate,
wherein a thickness of the passivation film is in the range of 0.05 to 2 μm.

12. The liquid crystal display device as set forth in claim 11, wherein the passivation film is formed to cover both the spacer body and the substrate body on which the spacer body is formed.

13. The liquid crystal display device as set forth in claim 11, wherein the passivation film is an organic film that includes a thermosetting resin or a photocurable resin.

14. The method as set forth in claim 1, wherein in the forming of the spacer body, the spacer body includes silica, polymer, surface-treated silica, surface-treated polymer, or fiber piece.

15. The method as set forth in claim 7, wherein in the forming of the spacer body, the spacer body includes silica, polymer, surface-treated silica, surface-treated polymer, or fiber piece.

16. The method as set forth in claim 1, wherein in the forming of the spacer body, the spacer body is a photo spacer body that includes photosensitive material.

17. The method as set forth in claim 7, wherein in the forming of the spacer body, the spacer body is a photo spacer body that includes photosensitive material.

* * * * *